United States Patent [19]

Sahara

[11] Patent Number: 4,868,947
[45] Date of Patent: Sep. 26, 1989

[54] MOTOR VEHICLE WIPER

[75] Inventor: Hidesi Sahara, Toyohashi, Japan

[73] Assignee: ASMO Co., Ltd., Kosai, Japan

[21] Appl. No.: 250,329

[22] Filed: Sep. 28, 1988

[30] Foreign Application Priority Data

Sep. 30, 1987 [JP] Japan ................. 62-248550

[51] Int. Cl.[4] .............................................. B60S 1/36
[52] U.S. Cl. ................................................ 15/250.21
[58] Field of Search ............. 15/250.21, 250.3, 250.34, 15/250.35, 250.31, 250.23, 250.13; 74/30, 31, 89, 89.11, 89.12, 89.17, 109

[56] References Cited

U.S. PATENT DOCUMENTS

| 3,003,173 | 10/1961 | Ziegler | 15/250.23 |
| 3,606,629 | 5/1970 | Parker | 15/250.21 |
| 4,447,928 | 5/1984 | Schüch et al. | 15/250.21 |
| 4,642,838 | 2/1987 | Fuzita et al. | 15/250.21 |
| 4,701,971 | 10/1987 | Prohaska | 15/250.21 |

FOREIGN PATENT DOCUMENTS

| 0218192 | 4/1987 | European Pat. Off. | 15/250.21 |
| 1066890 | 10/1959 | Fed. Rep. of Germany | 15/250.21 |
| 2215335 | 10/1973 | Fed. Rep. of Germany | 15/250.21 |
| 2417128 | 10/1975 | Fed. Rep. of Germany . | |
| 2430163 | 1/1976 | Fed. Rep. of Germany . | |
| 59-151759 | 10/1984 | Japan . | |
| 59-184254 | 12/1984 | Japan . | |
| 59-187549 | 12/1984 | Japan . | |
| 61-41648 | 2/1986 | Japan . | |
| 61-169355 | 7/1986 | Japan . | |
| 61-169356 | 7/1986 | Japan . | |
| 62-59559 | 4/1987 | Japan . | |

Primary Examiner—Harvey C. Hornsby
Assistant Examiner—Scott J. Haugland
Attorney, Agent, or Firm—Burns, Doane, Swecker & Mathis

[57] ABSTRACT

In a wiper of the present invention of a telescopic construction, a wiper arm is divided into two, namely, upper and lower arm parts. The upper arm is arranged to be slid in relation to the lower arm which is a housing for the upper arm. In the above construction, since the upper arm is driven by a compact double mechanism which comprises a crank, a pinion and a pair of racks, the upper arm can be slid by large degrees without requiring a large space. Therefore, the wiping area is advantageously enlarged according to the present invention.

1 Claim, 6 Drawing Sheets

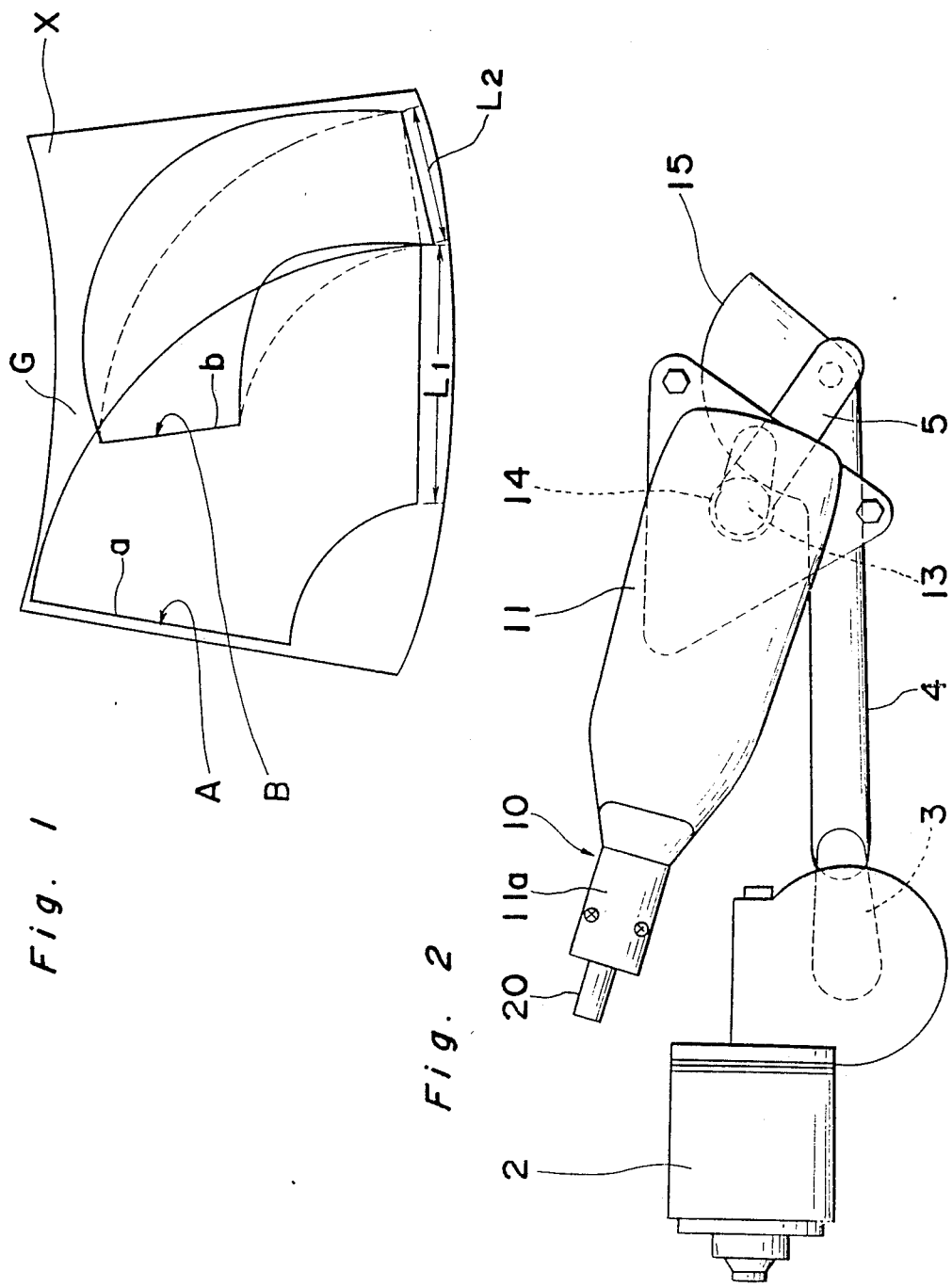

MOTOR VEHICLE WIPER

BACKGROUND OF THE INVENTION

The present invention generally relates to a wiper of a motor vehicle and, more particularly, to a wiper of a motor vehicle having a wiper arm arranged to expand and contract along the surface of a windshield so as to effect a wide-range wiping of the windshield.

A conventional wiper arrangement of a so-called telescopic construction disclosed in Japanese Patent Laid-open Tokkaisho No. 61-41648 (41648/1986) has a wiper arm divided into upper and lower parts. The lower part is swingingly mounted in a vehicle body, and the upper part which is a housing is slidably arranged in relation to the lower part, so that the length of the wiper arm is able to be changed during the wiping operation. The above-described wiper arrangement is already practiced.

In the wiper arrangement of the above-described type, since a driving shaft for swinging the wiper arm and another driving shaft for sliding the upper part in relation to the lower part are separately provided at different positions of the vehicle body, the driving mechanism becomes unfavorably complicated and bulky, and at the same time, requiring a larger mounting space. Moreover, the length of the wiper arm cannot be changed with much degrees in the above-described conventional arrangement, resulting in such difficulties that the wiping pattern of the wiper arm is hard to follow the glass surface of the windshield.

SUMMARY OF THE INVENTION

An essential object of the present invention is to provide a wiper of a so-called telescopic construction in which a wiper arm is divided into a lower first arm driven by a swinging shaft and an upper second arm so provided as to be slidable within the first arm, with a driving mechanism also provided in the first arm for sliding the second arm, so that the length of the wiper arm can be changed during the wiping operation of the wiper by sliding the second arm.

In the wiper arrangement of the present invention, the sliding degree of the second arm is increased, more specifically, the second arm is arranged to be able to be slid in larger degrees than the rotation diameter of a crank provided in the first arm for sliding the second arm, and therefore the wiping area is widened to a large range. Moreover, the driving force for sliding the second arm is arranged to be transmitted coaxially by a wiper swinging shaft, and accordingly the wiper arrangement is made simple and compact in structure, requiring a smaller space for mounting.

In accomplishing the above-described object, according to the present invention, a wiper of a telescopic construction has a wiper arm divided into a first arm and a second arm. The second arm is slidably arranged in relation to the first arm which has a driving mechanism for sliding the second arm, so that the second arm can be extended or retracted in relation to the first arm. The wiper of the present invention further includes a lever rotated by a motor and coupled to the first arm via a swinging shaft so as to swing the first arm, a sliding operation shaft fitted in the swinging shaft, a gear secured to one end of the sliding operation shaft and meshed with a gear of the lever for rotation, a crank fixed to the other end of the sliding operation shaft and meshed with a gear of the lever for rotation, a crank fixed to the other end of the sliding operation shaft projecting within the first arm, a rod with a pinion coupled to the end of the crank, and a pair of racks respectively fixed within the first arm and provided in the second arm to be meshed with the pinion.

As described above, the first arm plays a role of a housing for the second arm, in which a driving mechanism for sliding the second arm which is comprised of the crank, rod, pinion and a pair of racks is provided. Therefore, the second arm can be expanded and contracted by the degree four times the rotation radius of the crank, resulting in a wider area able to be wiped by the wiper, without rendering the first arm to be large in size.

Further, if the rotation angle of the swinging shaft and the rotation number of the gear fixed to the driving shaft for sliding the second arm are adjusted, the swinging range of the first arm and the number of the expansion-contraction times of the second arm within the above swinging range can be suitably applied both in a wiper arrangement of two wiper arms and in a wiper arrangement of one wiper arm. For example, in the case where the telescopic wiper arrangement of the present invention is employed for, for example, a navigator's side, and a wiper having a long wiper blade is employed for a driver's side, the wiping pattern of both wiper blades is able to cover almost all over the surface of the windshield. Moreover, if the swinging range of the wiper arrangement is arranged to cover approximately all over the glass surface of the windshield, and the second arm is arranged to repeat the expansion-contraction movement two times, the wiping pattern may follow the surface of the windshield even in a wiper arrangement having one wiper arm.

BRIEF DESCRIPTION OF THE DRAWINGS

These and other objects and features of the present invention will become clear from the following description taken in conjunction with the preferred embodiments thereof with reference to the accompanying drawings, in which:

FIG. 1 is a view schematically showing the locus of wiper arms of a wiper arrangement according to a first embodiment of the present invention;

FIG. 2 is a plan view of the wiper arm of FIG. 1;

DETAILED DESCRIPTION OF THE PREFERRED EMBODIMENTS

Figure 3:
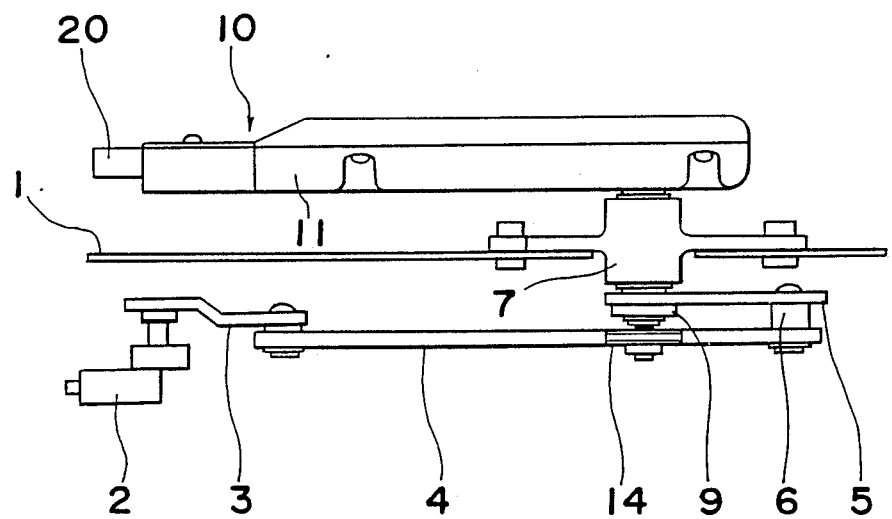
FIG. 3 is a front elevational view of FIG. 2.
Figure 4:
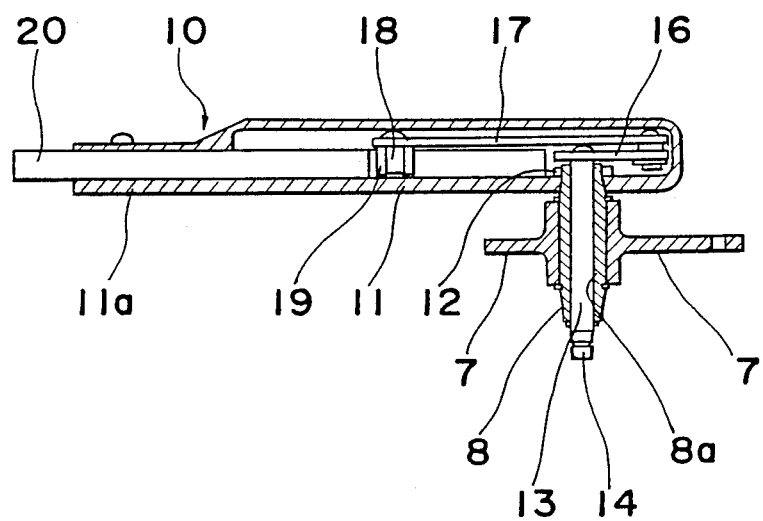
FIG. 4 is a cross sectional view of an essential part of FIG. 3.
Figure 5:
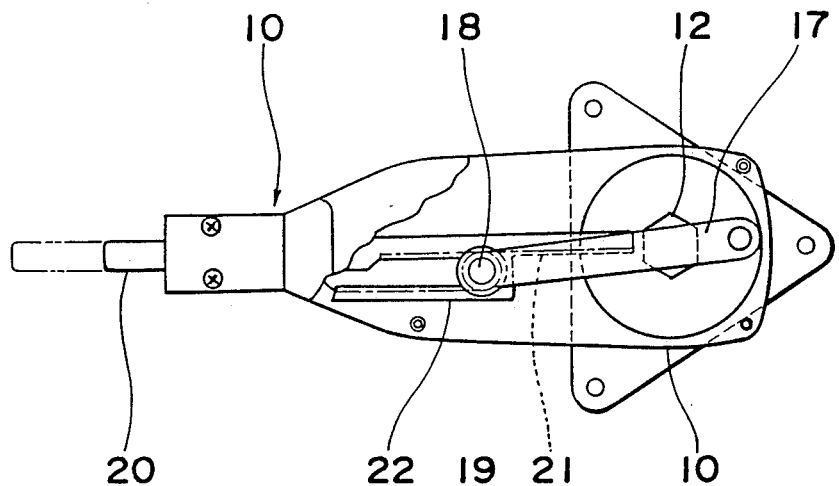
FIG. 5 is a plan view, partially cut off, of a driving mechanism for sliding a second arm within a housing.

Before the description of the present invention proceeds, it is to be noted that like parts are designated by like reference numerals throughout the accompanying drawings.

FIGS. 1 through 5 illustrate a wiper arrangement according to a first embodiment of the present invention. As shown in FIG. 1, two wipers A and B are provided at a driver's seat side and at a navigator's seat side, respectively. The wiper A at the driver's seat side has a wiper blade a in a longer length $L_1$. Since the wiping area by the wiper A can be extended nearly all over the glass surface of a windshield G at the driver's seat side only by swinging the wiper blade a, the wiper A is not provided with an expansion-contraction mechanism. On the contrary, the wiper B at the navigator's seat side has a wiper blade b in a length $L_2$ which is set short from the relation with the wiper blade a. Therefore, the wiping area by the wiper B is narrow, as shown by a chain line in FIG. 1, if the blade b is simply swung. In consequence, a lot of portions on the glass surface of the windshield G remain without being wiped. Accordingly, if a wiper having an expansion-contraction mechanism embodied by the present invention is employed for the wiper B, the wiping area by the wiper B is enlarged as shown by a solid line, resulting in total enlargement of the wiping area by the wipers A and B.

Referring to FIGS. 2 through 5 showing the wiper arrangement according to the first embodiment of the present invention, one end of a crank 3 is coupled to an output shaft of a motor 2 secured to a bracket at the side of a vehicle body 1, while the other end of the crank 3 is connected with one end of a rod 4 via a shaft, so that the rod 4 is rendered rotatable. The other end of the rod 4 is rotatably connected to one end of a lever 5 through a pivot 6. The lever 5 has its other end fixedly secured to a cylindrical swinging shaft 8 by a nut 9. The swinging shaft 8 is rotatably fitted in a holder 7 secured to the vehicle body. At one end of the swinging shaft 8, a housing 11 constituting a lower first swinging arm of a wiper arm 10 is fixed to a nut 12, and accordingly, the swinging shaft 8 is rotated through the crank 3, the rod 4 and the lever 5 by the rotation of the motor 2, thereby to swing the housing 11.

Meanwhile, a driving shaft 13 for sliding operation is so rotatably fitted within a hollow portion 8a of the swinging shaft 8 as to project from the lower end of the swinging shaft 8. A gear 14 is fixed to the projected end of the shaft 13. Further, a fan-shaped gear 15 which has its fulcrum at the pivot 6 is integrally formed with the rod 4 at the position where the rod 4 driven by the motor 2 is coupled to the lever 5. Accordingly, when the rod 4 is driven by the motor 2 through the crank 3 while the gears 15 and 14 are meshed with each other, the sliding operation shaft 13 is rotated through the gears 15 and 14. The sliding operation shaft 13 is projected from the swinging shaft 8 within the housing 11 to be securely fixed to one end of a short crank 16. When the crank 3 directly connected to the motor 2 is rotated half, the crank 16 inside the housing 11 is rotated one rotation. Then, when the crank 3 is rotated another half rotation, the crank 16 is rotated one rotation in the reverse direction to that of the precedent rotation. The crank 16 has its other end rotatably shaft-coupled to one end of a long rod 17. A pinion 19 is rotatably provided with a pin 18 which is fixed to the other end of the rod 17.

Within the housing 11 forming the first swinging member of the wiper arm 10, a second arm 20 constituting an upper sliding member of the wiper arm 10 is slidably supported by a guide portion 11a which is integrally formed with the housing 11. The second arm 20 is supported by the guide portion 11a in such a manner that a part of the second arm 20 is projected out of the housing 11. A movable first rack 21 is integrally fixed by a screw or the like to the second arm 20 accommodated in the housing 11. Moreover, a second rack 22 is secured correspondingly to the first rack 21 in the housing 11. The second rack 22 is meshed with the pinion 19 of the first rack 21. As described above, the sliding mechanism for the second arm within the housing 11 is comprised of the crank 16, rod 17, pinion 19, fixed rack 22 and movable rack 21. In the above construction, the moving distance of the movable rack 21 is arranged to be the distance 4d four times the radius d of the crank 16. Therefore, when the pinion 19 is moved on the surface of the fixed rack 22 because of the rotation of the crank 16, the movable rack 21 is moved two times as much as the moving distance of the pinion 19. Accordingly, the second arm 20 integral with the movable rack 21 is projected or accommodated out of or into the housing 11 to a large degree, and therefore the wiper arm 10 formed by the first arm 11 and the second arm 20 can be extended or contracted widely.

Although it is not shown in the drawings, a sub-arm provided with a blade as in the prior art is coupled to the end of the second arm 20 which is projected from or accommodated in the housing 11, and at the same time, a spring is provided to press the blade of the sub-arm against the surface of the windshield.

Because of the above-described construction, during the operation of the wiper, the housing 11 is rotated in the range of about 120° at the widest, although it depends on the length of each of the crank 3 and the lever 5, through the swinging shaft 8 only by half a rotation of the motor 2, so that the wiper blade is moved along the surface of the windshield to wipe the surface. At this time, the sliding operation shaft 13 is simultaneously rotated one rotation by the half rotation of the motor 2, and as a result of this, the second arm 20 is moved one reciprocal movement in relation to the housing 11, that is, extended and contracted by the sliding mechanism in the housing 11. As shown in FIG. 1, when the second arm 20 is extended most, namely, projected most out of the housing 11, the second arm 20 is directed to the corner x on a diagonal line of the windshield G. Therefore, the wiper is able to wipe the surface of the windshield including the portions which could not be wiped by the prior art, and the wiping area can be enlarged as compared with the prior art.

Figure 7:
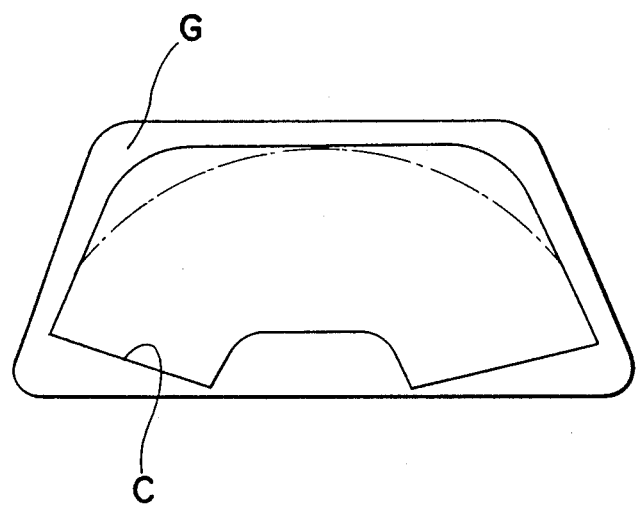
FIG. 7 is a view schematically showing the locus of a wiper arm of a wiper arrangement according to a second embodiment of the present invention.
Figure 6:
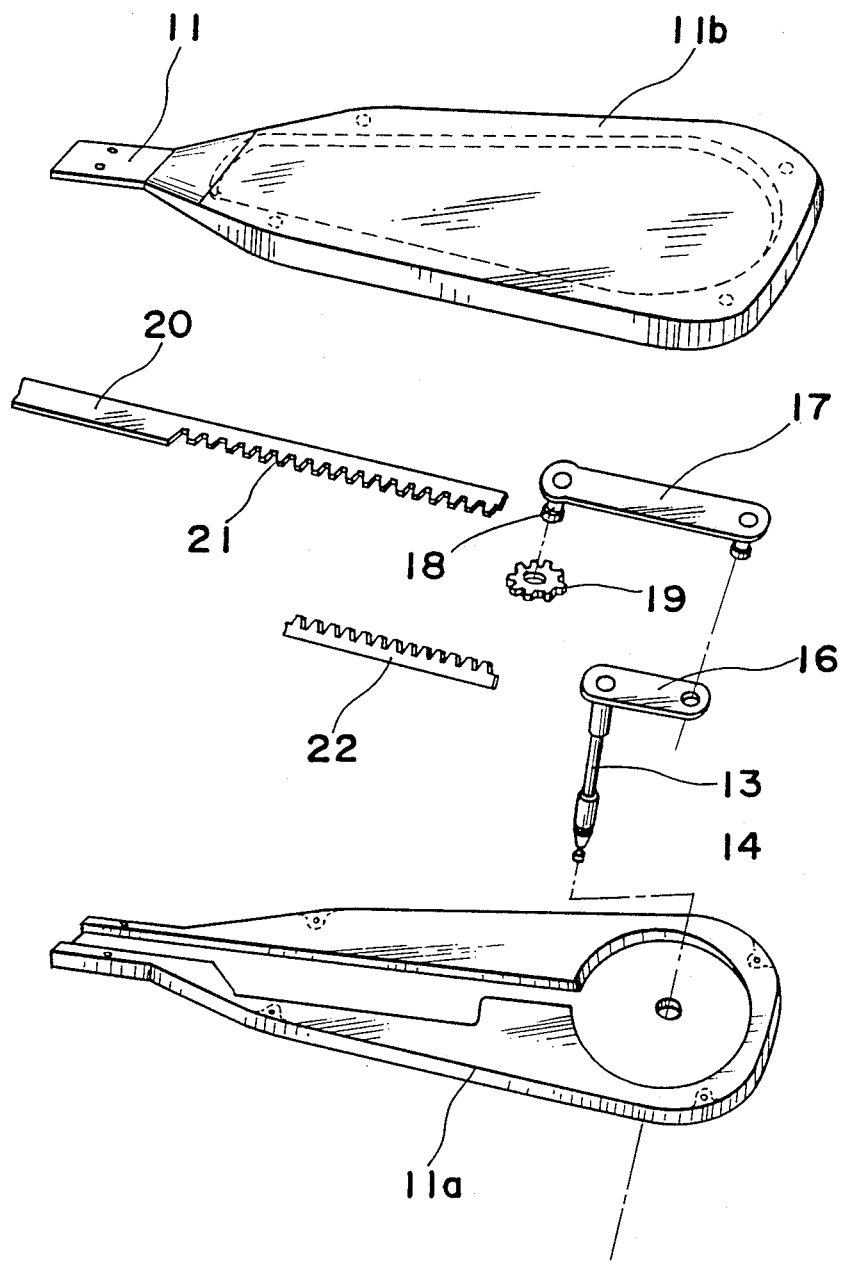
FIG. 6 is an exploded perspective view of FIG. 4.
Figure 8:
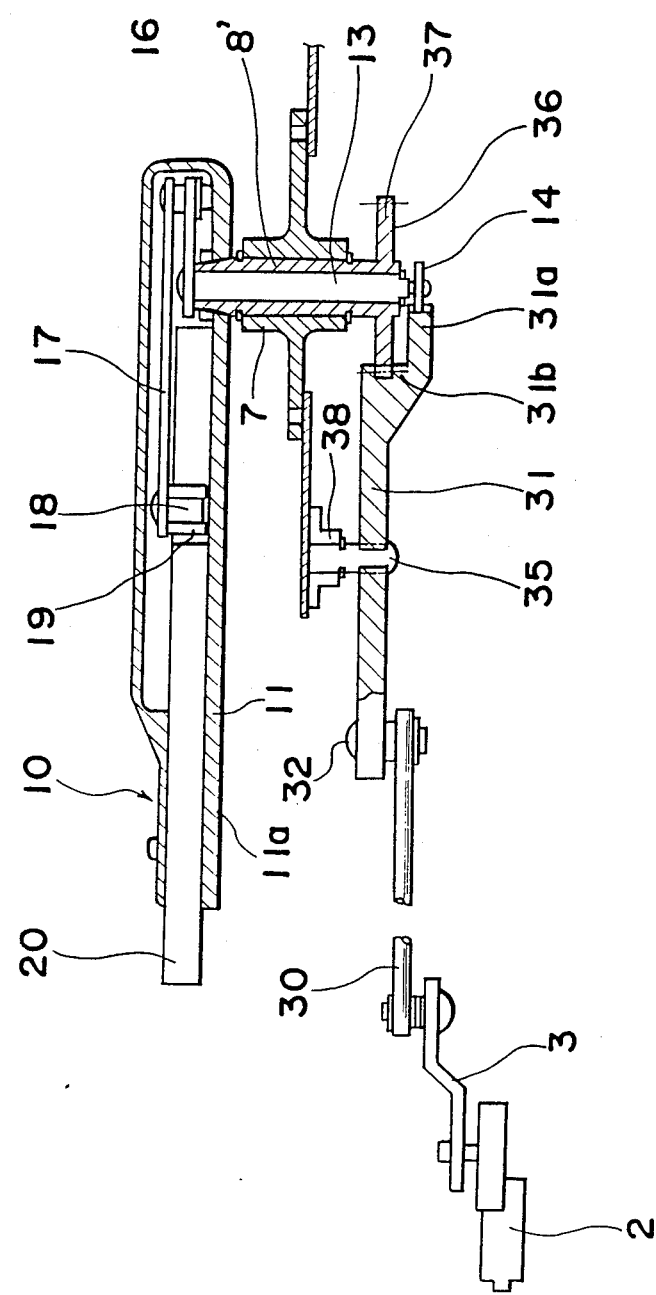
FIG. 8 is a cross sectional view of the wiper arrangement of FIG. 7.
Figure 9:
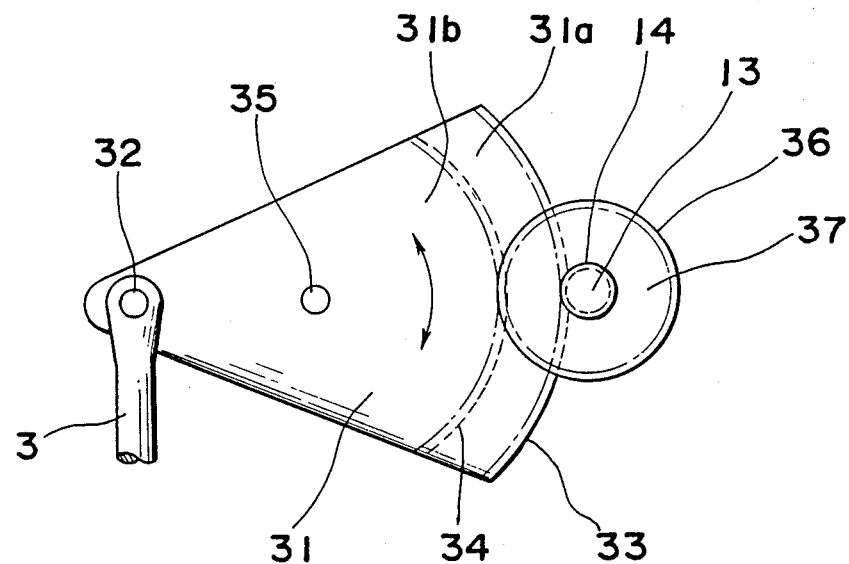
FIG. 9 is a plan view of an essential part of the wiper arrangement of FIG. 7.
Figure 10:
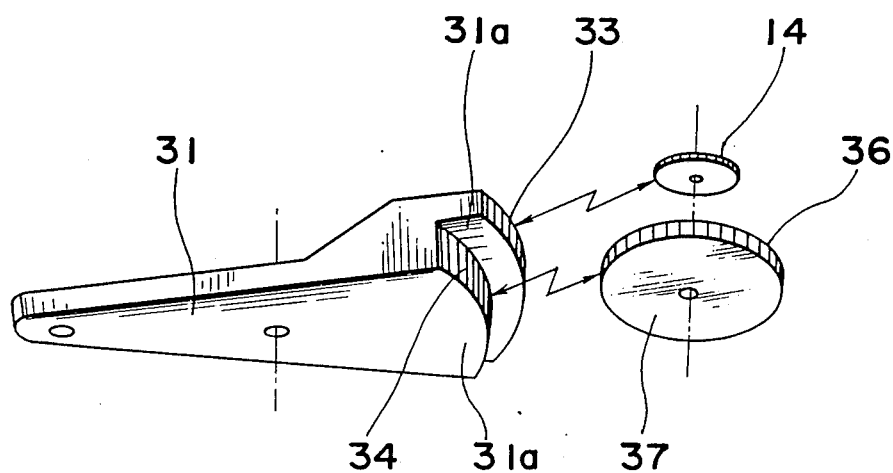
FIG. 10 is an exploded perspective view of FIG. 9.

FIGS. 7 through 10 show a wiper according to the second embodiment of the present invention. As shown in FIG. 7, according to the second embodiment, the wiping angle of the wiper arm is enlarged, and accordingly one wiper arm C can cover nearly all over the surface of the windshield G both at the driver's seat side and at the navigator's seat side. Moreover, according to the second embodiment, a wiper blade c is arranged to repeat the extension and contraction movement two times in one swinging movement of the wiper arm C, so that the wiper blade c can be moved farther towards the right and left upper corners of the windshield G from the position shown by a one-dot line to the position shown by a solid line in FIG. 7.

As indicated in the drawings, in the second embodiment, one end of a rod 30 is rotatably pivoted on the crank 3 coupled to the motor 2, and the other end of the rod 30 is connected to one end of a lever 31 through a shaft 32, so that the lever 31 is rotatably connected to the rod 30. Moreover, the lever 31 has fan-shaped portions 31a and 31b in two-stepped form at the other end thereof. The fanshaped portion 31a projecting outwards in the upper step has a gear tooth 33 formed at the end surface thereof, and the lower fan-shaped portion 31b has a gear tooth 34 formed at the end surface thereof. A rotary shaft 35 is fixedly provided approximately at the center of the lever 31, which is rotatably held by the bracket of the vehicle body 1 through a bearing 38. Accordingly, when the motor 2 is rotated, it makes the lever 31 rotate in a direction shown by an arrow.

On the other hand, a gear part 37 having a large diameter is integrally and projectingly formed with a swinging shaft 8' rotatably held within the holder 7 at the lower side of the swinging shaft 8'. A gear tooth 36 of the gear part 37 is meshed with the tooth 34 of the lever 31, and the gear 14 which is fixed to the lower end of the sliding operation shaft 13 rotatably fitted in the swinging shaft 8' as in the first embodiment is meshed with the gear tooth 33 of the lever 31. The swinging shaft 8' is secured to the housing 11 in the same manner as in the first embodiment. At the same time, the sliding operation shaft 13 is fixed to the crank 16 within the housing 11. By a double mechanism of the driving mechanism comprising the crank 16, rod 17, pinion 19 and a pair of racks 21 and 22, the second arm 20 of the wiper arm 10 is arranged to be extended or retracted in relation to the housing 11, which is the same as in the first embodiment.

In the second embodiment of the present invention described above, during the half rotation of the motor 2, the lever 31 is rotated in one direction. At this time, since the gear tooth 34 and the gear tooth 36 are meshed with each other, the swinging shaft 8' is rotated in the other direction, so that the wiper arm 10 is swung to cover approximately all over the surface of the windshield G as shown in FIG. 7. On the other hand, during the half rotation of the motor 2, the gear 14 meshed with the gear tooth 33 of the lever 31 is rotated two times, thereby rotating twice the sliding operation shaft 13. Accordingly, the second arm 20 is extended two times through the double mechanism within the housing 11. Thus, the wiper blade is extended towards the right and left upper corners of the surface of the windshield G, displaying the wiping pattern along the surface of the windshield as shown in FIG. 7. It is to be noted here that a one-dot line in FIG. 7 shows the wiping pattern in the case where the second arm 20 is not extended.

As is described hereinabove, according to the present invention, the wiper arm is divided into two, namely, the lower first arm and the upper second arm. The first arm is a housing for the second arm. The wiper of the present invention is formed in the so-called telescopic construction, wherein the second arm is slid in relation to the housing. The second arm is driven by the double mechanism comprised of the crank, rod, pinion and a pair of racks. According to the above-described construction, therefore, the second arm can be slid by the distance four times the rotation radius of the crank. The sliding distance of the second arm can be secured large because of the above-described compact, space-saving mechanism. As a result, the second arm can be extended to a large extent, and the windshield can be wiped in a wide range along the glass surface thereof.

Moreover, the swinging shaft is made hollow in the present invention, so that the sliding operation shaft is rotatably fitted within the swinging shaft. Consequently, the wiper of the present invention is advantageous in that the wiper is simple in structure, with reduced number of parts, and compact in size.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A windshield wiper apparatus for a motor vehicle having a wiper arm divided into a first arm and a second arm, said first arm being provided with a driving mechanism therein for sliding said second arm, and said second arm being slidably provided in relation to said first arm, so that said second arm is extended or retracted in relation to said first arm, the improvement further comprising:

motor, a swinging shaft and a sliding operation shaft within said swinging shaft, a lever rotated by said motor and coupled to said first arm so as to swing said first arm through said swinging shaft, the lever having a gear thereon, a gear secured to one end of said sliding operation shaft to be meshed with said gear on said lever for rotation, a crank secured to the other end of said sliding operation shaft projecting in said first arm, a rod with a pinion coupled to the end of said crank, and a pair of racks meshing with the pinion, one of the racks being fixed in said first arm and the other being provided with said second arm.

* * * * *